Aug. 9, 1966    R. THOMAS    3,265,974
SIGNAL DETECTING METHODS AND DEVICES
Filed Nov. 28, 1962    3 Sheets-Sheet 1

INVENTOR
Roy Thomas
By Pierce, Scheffler & Parker
Attorneys

INVENTOR
Roy Thomas
By Pierce, Scheffler & Parker
Attorneys

FIG. 5.

United States Patent Office 3,265,974
Patented August 9, 1966

3,265,974
SIGNAL DETECTING METHODS AND DEVICES
Roy Thomas, Acton, London, England, assignor to English Electric-Leo Computers Limited, London, England, a British company
Filed Nov. 28, 1962, Ser. No. 240,500
Claims priority, application Great Britain, Nov. 30, 1961, 42,974/61
7 Claims. (Cl. 328—63)

This invention relates to signal detecting devices for checking the timing of pulse signals. Many types of electric and electronic apparatus, notably electronic computers employ pulse signals whose significance and/or effect varies with this time of occurrence, and it is therefore desirable to monitor the timing of such signals with a device which produces a signal whenever the timing is sufficiently incorrect to introduce a risk of faulty operation.

The invention may with advantage be used in computer input assemblies for sensing data from media such as punched tape or cards, or magnetic tape, where as is well known the input medium may have its stored data slightly displaced from its correct position and/or as the medium is moved past the "reading" (i.e. sensing) device it may be displaced in some manner so that electric pulses produced by the sensing of punched holes or the like are slightly displaced in time from their proper positions.

It is an object of the present invention to provide a signal detecting device for the above purpose, operable to produce output signals for indication and/or control purposes whenever the timing of pulses being monitored is outside predetermined tolerances.

According to the invention, there is provided a signal detecting device for checking the timing of signal pulses relative to a sequence of strobing pulses available to the device at known times relative to the proper time of occurrence of each of said signal pulses, comprising detecting means adapted to produce an output signal whenever one of said signal pulses and one of said strobing pulses are concurrently received thereby, settable means arranged to be progressively set to different states by said output signal or signals, decoding means controlled by the state of said settable means, and further means for applying an input to said decoding means after the termination of the sequence of strobing pulses, so as to allow the state of said decoding means to be ascertained.

It is of course understood that the term pulse signal used herein can indicate a change of state whether the change be positive or negative with respect to the state where no signal is present.

In electric or electronic apparatus in which this invention is used, the decoding means may be provided by such conventional gating means as AND gate circuitry.

At present it is preferred to supply three strobing pulses for each time at which a signal pulse may appear, the second of said strobing pulses being timed to occur midway through the signal pulse if the latter is correctly timed, the other two strobing pulses occurring at equal intervals before and after said second strobing pulse and still at least partly within the time which should be occupied by the signal pulse. This secures that, if the signal pulse occurs at or close to the correct time, all three strobing pulses produce output signals from the detecting means; when the signal pulse is advanced or delayed by a somewhat greater amount it fails to coincide with the third or the first strobing pulse respectively and only two output signals are produced by the detecting means; while for even greater errors in the signal pulse timing only one output signal or none at all will be produced.

It will be appreciated that the settable means will reach different states in response to these different signals, and therefore in each case the gating means will be in a different condition after the last strobing pulse; for example it may be arranged that if the output signals appear at the times of all three strobing pulses, the gating means is completely closed. If output signals appear from the detecting means at the times of the first and second, or the second and third, of the strobing pulses then the settable means so conditions the gating means that the input to the latter gives an output on one output line (which may for example lead to an operator-warning device); and if the detecting means delivers an output signal at the time of only one of the strobing pulses, then an output from the gating means goes to a different output line (e.g. leading to a control device which on energisation stops the apparatus with which the signal detecting device is associated).

I prefer that the settable means should take the form of a counter, and where three strobing pulses are provided for each possible signal pulse the counter may be a two denomination binary counter, e.g. two trigger circuits interconnected in known manner. When such a counter is employed, the detecting means coveniently is provided by a single AND circuit with two inputs connected respectively to receive signal pulses and strobing pulses. As the counter will necessarily reach the same state for any given number of output signals received from the detecting means i.e. of coincidences between signal and strobing pulses, it follows that the device cannot give different indications for all possible relationships between signal and strobing pulses but this is not necessarily material.

In an alternative arrangement, the detecting means may comprise at least as many AND circuits as there are strobing pulses for each possible signal pulse, the successive strobing pulses which should coincide with a correctly-timed signal pulse being directed to different AND circuits so that the output signals derived therefrom are available on different output lines. The output signals from the detecting means may then be in effect stored by connecting trigger circuits to said output lines through logical circuits so arranged that a different combination of states of the trigger circuits is obtained for each relationship or group of relationships between the signal and strobing pulses required to be separately indicated.

In either arrangement, it may be convenient that the further means comprises a delay circuit connected to receive the last of the strobing pulses corresponding to each signal pulse and transmit it to the gating means after the settable means has completed any change of state arising at the time of such last strobing pulse.

If it is desired to obtain a different indication for the first or last strobing pulse failing to coincide with the signal pulse, as previously stated, the first arrangement described above could not achieve this, but with a suitable logical circuit arrangement, the alternative arrangement could be made to supply such indications. Such a suitable logical circuit arrangement for a signal detecting device using three strobing pulses is as follows.

The detecting means comprises three AND circuits, the signal pulse being directed to one input of each of the AND circuits and each of the three strobing pulses being directed to the other input of different AND circuits. The output from each AND circuit is connected to the "setting" input of a separate trigger circuit and to outputs from the three trigger circuits can then be directed to inputs of the gating means. The gating means which may comprise several AND circuits can then be so arranged that any one combination of states of the three trigger circuits gives a different output when the further means applies an input to the gating means. We prefer however to provide essentially that one output obtains for the state of the three trigger circuits if the first strobing pulse fails to coincide with the signal pulse and a different output obtains if the third strobing pulse fails to coincide with the signal pulse.

The device just described wherein two different outputs are provided for loss of coincidence of either the first or third strobing pulse with the signal pulse can be used to adjust the timing of the strobing pulses to correct such relatively small errors. If, for instance, each signal pulse is obtained from a hole in a punched card and all the holes have been punched equally slightly out of true, then adjustment of the timing of the strobing pulses after sensing holes in the punched card will have the effect of correcting the slight error which occurred in punching. A particular arrangement of an adjusting device which provides for adjustment of the timing of the strobing pulses supplied to the last described signal detecting device may be provided in the following manner.

In this arrangement, for each time interval during which a signal pulse can occur, sixteen reference pulses are applied to an input of the adjusting device, these reference pulses being supplied to a sixteen denomination counter. When the fourth, eighth and twelfth reference pulses enter the counter, the counter gives outputs which are applied to the detecting means as the first, second and third strobing pulses, respectively. If, after all the strobing pulses have been applied and the gating means have been energised the detecting means supplies an output on one of the two output terminals, this output pulse effects the number of reference pulses supplied to the counter.

If, for example, the first strobing pulse does not coincide with the signal pulse, then the output pulse derived from the detecting means has the effect of preventing one of the reference pulses from entering the counter. Thus the first strobing pulse for the next time interval occurs at a time when the fifth reference pulse is applied to the adjusting device and the two other reference pulses are similarly delayed.

Thus the timing of the three pulses is delayed by one sixteenth of the time interval during which a signal pulse can occur and the chance of the next signal pulse coinciding with the strobing pulses is increased (presuming that all signal pulses have been similarly displaced within their time intervals).

Similarly, if the last strobing pulse fails to coincide with the signal pulse, then for the next time interval all the strobing pulses are advanced by one sixteenth of a time interval by the other output of the signal detecting device causing an extra pulse to enter the counter (so that, e.g. three reference pulses only are needed to produce a first strobing pulse).

In either case if the correction thus made is insufficient then of course further corrections will be made after each of the following time intervals until all the strobing pulses coincide with the signal pulse. Also in this arrangement, the further means may be provided as an output from the adjusting means when for instance, the fifteenth pulse is applied to the counter.

In order that the invention may be well understood, preferred embodiments thereof will now be described in some detail, referring to the accompanying drawings in which.

Figure 1:
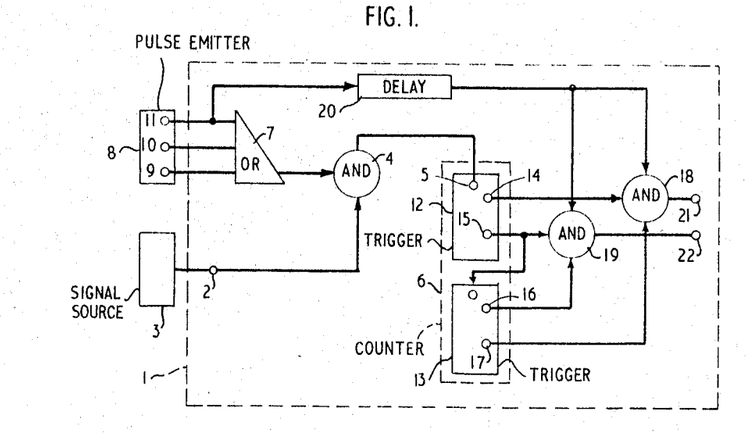
FIGURES 1 and 2 are block diagrams of devices embodying the invention.
Figure 3:
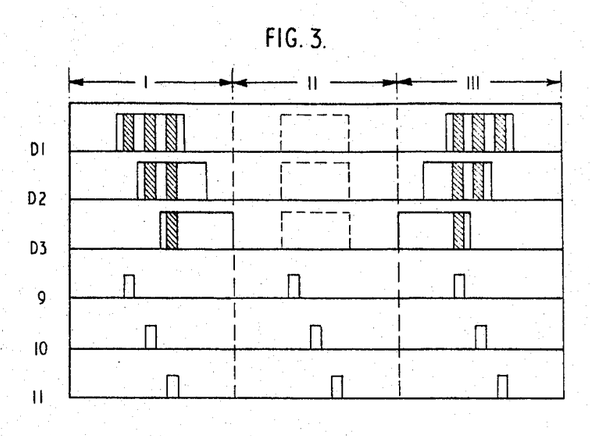
FIGURE 3 shows the relative timing of various signals in the devices of FIGS. 1 and 2.

Referring first to FIGURE 1 of the drawings, a signal detecting device 1 is shown with its input terminal 2 connected to a source 3 of data-representing pulse signals, the signals derived therefrom being represented in FIG. 3 by lines D1–D3 inclusive; line D1 shows the signals emitted by source 3 when there is no fault in timing, line D2 the same signals with a small timing error, and line D3 the same signals again but with a larger timing error. Within the device 1, terminal 2 is connected to one input of a two-input AND circuit 4 whose output is connected to the input terminal 5 of a two-denomination binary counter 6. The other input of the AND circuit 4 is connected to the output of an OR circuit 7 with three inputs separately connected to a pulse emitter 8 having three separate output terminals 9, 10, 11.

The counter 6 has separate stages 12, 13 for its two denominations, each stage conveniently being a trigger circuit, with a carry connection therebetween. Each of stages 12, 13 has two output terminals 14, 15 and 16, 17 respectively, the lower output terminals 15 or 17 being energised whenever the stage is in the "0" condition and the upper output terminal 14 or 16 being energised whenever the stage is in the "I" condition. Terminals 14 and 17 are connected to two separate inputs of an AND circuit 18, while terminals 15 and 16 are similarly connected to two separate inputs of an AND circuit 19. Each of the AND circuits 18, 19 has a third input and these third inputs are connected together and, via a delay circuit 20, to terminal 11 of pulse emitter 8. The outputs of the AND circuits 18, 19 provide the outputs of the device at terminals 21, 22 respectively.

The operation of the device being essentially governed by relative timing of signals, attention is now directed to FIG. 3, which shows graphically the times of occurrence of various signals, during three successive intervals of time I, II, III, a single time scale being used so that points which are in vertical alignment indicate the state of the several signals depicted at the same instant. Line D1 shows a correctly timed data-representing pulse in each of intervals I and III, in interval II it is assumed no pulse is present but the dotted outline indicates the time at which a pulse could occur. Lines D2, D3 show similar data-representing pulses to those in line D1, but in line D2 both pulses are slightly mistimed (as compared with the dotted outline showing correct timing) and in line D3 both pulses are more greatly mistimed. In both lines D2, D3 the pulses in interval I are shown delayed and the pulses in interval III shown advanced. All the pulses shown in lines D1–D3 include shaded areas representing that part of the pulse duration which coincides with the existence of a strobing pulse on any one of terminals 9, 10, 11 of pulse emitter 8, the lines 9, 10, 11 of the figure showing the relative times of occurrence of these strobing pulses.

From a comparison of lines 9–11 and line D1 of FIG. 3, it will be seen that strobing pulses on terminal 10 occur midway through every period in which a correctly-timed data-representing pulse appears or could appear, while strobing pulses on terminals 9 and 11 respectively occur at equal intervals before and after each strobing pulse on terminal 10, still within the periods of correctly-timed data-representing pulses.

When therefore, a correctly-timed data-representing pulse appears from source 3, during the existence of that pulse there are, in succession, strobing pulses on terminals 9, 10, 11 in that order (FIG. 3, line D1, time interval I or III).

In the circuit of FIG. 1, therefore, while the data-representing pulse on terminal 2 lasts, the second input of AND circuit 4 is energised three times, by strobing pulses from terminals 9, 10 and 11 of pulse emitter 8 in that order. Three output pulses are therefore delivered to terminal 5, and both stages of the counter 6 are therefore brought to the "1" condition. Accordingly after the end of the three pulses from the pulse emitter 8, neither terminal 15 nor terminal 17 is energised, and neither of the AND circuits 18, 19 can deliver an output.

Now considering the operation if a slightly delayed or slightly advanced data-representing pulse is received, as represented at line D2, time interval I or III respectively. In this case, only two of the three strobing pulses from pulse emitter 8 are received by AND circuit 4 during the time a data-representing pulse lasts at terminal 2, and consequently only two output pulses are produced by AND circuit 4 and stage 13 of counter 6 is brought to the "1" condition, stage 12 to the "0" condition. Again terminal 17 is not energised, and therefore AND circuit 18 cannot deliver an output, but AND circuit 19 has one input energised from terminal 16 and a second input energised from terminal 15. When the pulse from terminal 11, the last of the three strobing pulses, emerges from the delay circuit 20, all three inputs of AND circuit 19 are energised and accordingly an output appears at terminal 22.

If a data-representing pulse is even more delayed or advanced, as at line D3 time interval I or III respectively, then only one of the strobing pulses occurs during the data-representing pulse, and counter 6 receives only one pulse at terminal 5; hence stage 12 goes to the "1" condition, stage 13 remains in the "0" condition. Terminals 15 and 16 are not energised hence AND circuit 19 cannot give an output but terminals 14 and 17 are energised and so, therefore, are two inputs of AND circuit 18, thus when the reference pulse from terminal 11 reaches AND circuit 18 (after the delay imposed by circuit 20) an output appears at terminal 21.

The remaining possibility is that the data-representing pulse is so excessively mistimed that none of the strobing pulses occur during the period of the data-representing pulse. In this event the counter receives no pulses, both stages remain at "0" and as neither terminal 14 nor terminal 16 is energised, no output can be produced by either of the AND circuits 18, 19. While this is in a sense a false result, it will be appreciated that in practice the interval between each group of strobing pulses must be such that this condition cannot be met.

Summarising, therefore, a correctly-timed data-representing pulse gives no output at terminal 21 or terminal 22; slight mistiming gives an output at terminal 22, worse mistiming an output the terminal 21.

It is of interest to note that the device of FIG. 1, does not distinguish between late and early data-representing pulses, nor does it give a special output for the apparently impossible conditions which would be indicated by coincidence of the data-representing pulse with the first and third strobing pulses, but not the second, or with the second strobing pulse alone. While the circuit can have added features to indicate these effects the likelihood of the latter occurring is so remote that in most applications this is not necessary.

It will be undertood that, although not shown in FIG. 1, some means of resetting the counter 6 is necessary; various means may be adopted, e.g. the output from delay circuit 20 may be applied to a further delay circuit and the output from the latter employed as a reset signal.

Figure 2:
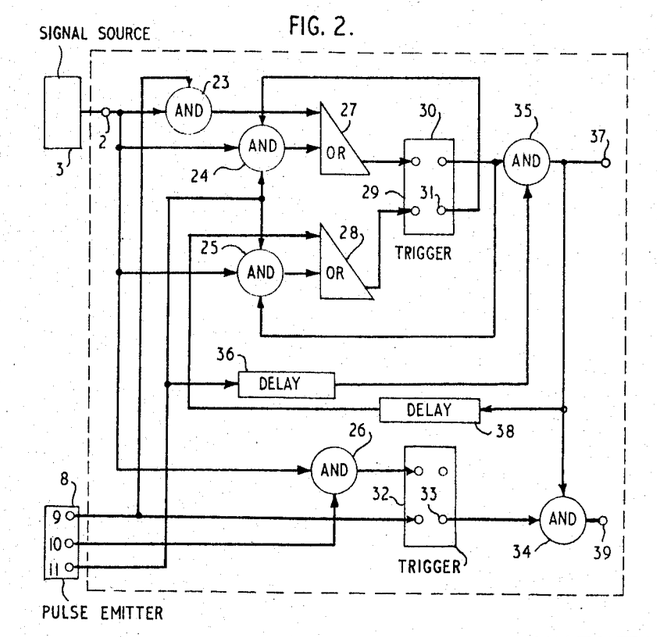

Now turning to FIG. 2 of the drawings, a somewhat different form of device embodying the invention is shown. Again the signal detecting device is generally indicated by reference 1 and has an input terminal 2 connected to a source 3 of data-representing pulse signals; also a pulse emitter 8 connected to the device 1 has output terminals 9, 10, 11 as before and the signals from source 3 and emitter 8 are as represented in FIG. 3.

In FIG. 2, however, terminal 2 is connected in parallel to one terminal of each of four logical AND circuits 23, 24, 25, 26, circuits 23 and 26 being two-input AND circuits and circuit 24 and 25 three-input AND circuits.

Another input of each of the AND circuits 23–26 is connected to the pulse emitter 8, terminal 9 being connected to the second input of AND circuit 23, terminal 10 to the second input of AND circuit 26, and terminal 11 to one of the remaining inputs of both AND circuit 24 and AND circuit 25.

The outputs of AND circuits 23 and 24 are connected to different inputs of a two-input logical OR circuit 27, and the output of AND circuit 25 is connected to one input of a two input logical OR circuit 28.

Both of the OR circuits 27, 28 have their outputs connected to control inputs of a trigger or "flip-flop" circuit 29, OR circuit 27 being connected to an input for "setting" the trigger circuit 29, OR circuit 28 to an input for "resetting" the trigger circuit 29. Two output connections 30, 31 are provided for the trigger circuit 29, these connections being energised as long as the trigger circuit is in the "set" and "reset" conditions respectively.

A further trigger circuit 32 has its setting input connected to the output of AND circuit 26 and its resetting input connected to terminal 9 of the pulse emitter 8. Trigger circuit 32 is only required to have one output connection 33 energised while the circuit is in the reset condition, which is connected to one input of a two-input AND circuit 34.

The "reset" output connection 31 of trigger circuit 29 is connected to the third input of AND circuit 24, while the "set" output connection 30 is connected both to the third input connection of AND circuit 25, and to one input of a two-input AND circuit 35. The second input of AND circuit 35 is connected via a delay circuit 36 to terminal 11 of pulse emitter 8. The output of AND circuit 35 is connected to a first output terminal 37 for the device, also to the second input of AND circuit 34, and via a delay circuit 38 to the second input of OR circuit 28. The output of AND circuit 34 is connected to a second output terminal 39 for the device.

The operation of the device of FIG. 2, is also, of course, dependent upon timing and as has been noted the various pulses again are assumed to be as represented in FIG. 3, which has already been explained.

In relation to the device of FIG. 2, therefore, it is again considered what occurs when a correctly-timed pulse is received from the source 3. During the existence of such a pulse, there are, in succession, strobing pulses on terminals 9, 10 and 11 of the emitter 8 in that order. In the circuit of FIG. 2 therefore, while the pulse on terminal 9 lasts, both inputs of AND circuit 23 are energised, and an output is delivered to OR circuit 27, which in turn supplies an output to set the trigger circuit 29; trigger circuit 29 thereupon ceases to supply the third input of AND circuit 24, but commences to supply the third input of AND circuit 25, and one of the inputs of AND circuit 35. The pulse on terminal 9 also serves to bring trigger circuit 32 to the reset condition, in which it energises one input of AND circuit 34.

When the strobing pulse on terminal 9 terminates, AND circuit 23 and OR circuit 27 ceases to deliver outputs, and nothing further happens until the strobing pulse on terminal 10 appears. As the pulse from source 3 persists, AND circuit 26 has both its inputs energised, and delivers an output to set trigger circuit 32 which on setting ceases to energise one output of AND circuit 34. With the termination of the pulse on terminal 10, the output from AND circuit 26 also ceases.

The strobing pulse on terminal 11 then appears, and as the pulse from source 3 still persists, AND circuits 24 and 25 each have two inputs energised; as trigger circuit 29 is still set, AND circuit 24 has no third input, but AND circuit 25 has all three inputs energised and delivers an output to OR circuit 28 which in turn supplies an output to reset trigger circuit 29 and remove energisation from one input of AND circuit 35; it will of course be apparent that if the resetting of trigger circuit 29 is completed before the pulse on terminal 11 ends, then AND circuit 24 will be fully energised and as a result trigger circuit 29 will again be set, which is not desired, and therefore to prevent this either trigger circuit 29 itself must have a relatively slow response or a delay network (not shown) must be included at some convenient point in the resetting circuit just described.

Finally, the strobing pulse from terminal 11 appears at the other input of AND circuit 35, delayed by circuit 36, but as the delay afforded by the latter circuit is such that output of this short pulse from circuit 36 only begins after input thereto has ended, AND circuit 35 does not have both inputs simultaneously energised and therefore no output appears on terminal 37. No output appears on terminal 39 either, as AND circuit 34 cannot produce an output in the absence of an output from AND circuit 35.

At the termination of a correctly timed pulse from source 3, the device is thus left in the same condition as at the start, with trigger circuit 29 reset, trigger circuit 32 set.

Now considering the situation illustrated in line D2, time interval I, i.e. the case where the data-representing pulse is slightly delayed. While the first strobing pulse exists on terminal 9, the data-representing pulse has not begun and therefore during the first strobing pulse the only action occuring is the resetting of trigger circuit 32, with consequent energisation of one input of AND circuit 34. By the time the strobing pulse on terminal 10 appears, the data-representing pulse has began, and, as before, AND circuit 26 is energised at both inputs, trigger circuit 32 is again set and energisation removed from the one input of AND circuit 34.

When the strobing pulse on terminal 11 appears, the data-representing pulse has not ended and therefore these two pulses simultaneously energise two inputs of both AND circuit 24 and AND circuit 25. As trigger circuit 29 in this instance has not been set, it is AND circuit 24 which has its third input energised by the trigger circuit and therefore an output goes to OR circuit 27 and the trigger circuit 29 is now set; at this point also the need for relatively slow response from this trigger circuit will be appreciated, as a quick change to the set condition would allow AND circuit 25 to come into play so that the trigger circuit 29 would promptly reset.

At the termination of the third strobing pulse in this case, both trigger circuits 29, 32 are set and therefore AND circuit 35 has one input energised but AND circuit 34 has neither input energised. Subsequently, the pulse from terminal 11 emerges from delay circuit 36 to energise the second input of AND circuit 35, which delivers an output to terminal 37, the second input of AND circuit 34 (where nothing further happens as trigger circuit 32 has been set) and to delay circuit 38; later yet, an output from delay circuit 38 goes to OR circuit 28 and hence trigger circuit 29 is reset.

The device therefore has been returned to its original state, but a signal has appeared at terminal 37 as a consequence of the slightly delayed appearance of the data-representing pulse.

The operation of the device when the data-representing pulse is more delayed (line D3 time interval I) may now be considered.

Briefly, during the occurrence of the first strobing pulse (terminal 9) trigger circuit 32 is reset, and during the occurrence of the second strobing pulse (terminal 10) nothing occurs. However, during the occurrence of the third strobing pulse (terminal 11) as the data-representing pulse has commenced, and trigger circuit 29 remains in its original reset condition, AND circuit 24 delivers an output, and through OR circuit 27, trigger circuit 29 is set. Consequently, when the delayed third strobing pulse is delivered to AND circuit 35, both inputs of the latter are energised, and a signal appears at terminal 37, is sent to delay circuit 38 to effect subsequent resetting of trigger circuit 29 as before, and goes to the AND circuit 34, as trigger circuit 32 remains reset, both inputs of AND circuit 34 are energised and terminal 39 also receives an output. Therefore, with this greater delay of the data-representing pulse, both terminals 37 and 39 received outputs.

To complete the picture, the possibility of early data-representing signals remains. First, if the data-representing pulse is slightly early (line D2 time interval III) then clearly at the time of the first and second strobing pulses the operation is identical with that described when the data-representing pulse is correctly timed, and immediately before the third strobing pulse appears we have both trigger circuits 29, 32 in the set condition. Then the third strobing pulse appears but neither of AND circuits 24, 25 delivers an output as the data-representing pulse has ceased; however the third strobing pulse still passes through delay circuits 36, and AND circuit 35 duly delivers an output to terminal 37, AND circuit 34 which has no other input as trigger circuit 32 is set, and through delay circuit 38 to OR circuit 28 whereby trigger circuit 29 is reset later. Thus with slight advance, as with slight delay an output appears on terminal 37 but none on terminal 39.

When the data-representing pulse is earlier yet (line D3, time interval III) the device responds as the correct timing during the occurrence of the first strobing pulse, and therefore when the second strobing pulse commences trigger circuit 29 is set, trigger circuit 32 reset. At the time of the second strobing pulse, the data-representing pulse has already ceased and therefore nothing occurs. When the third strobing pulse appears, as in the last instance AND circuits 24, 25 deliver no outputs but the strobing pulse goes to delay circuit 36, later reaches AND circuit 35, and an output is delivered to terminal 37, delay circuit 38 to reset trigger circuit 29 subsequently and AND circuit 34; in this instance however as trigger circuit 32 remains reset, AND circuit 34 delivers an output to terminal 39.

Summarising, the device described gives no output from either of terminals 37, 39 if a data-representing pulse is correctly timed in that it is in existence at the time of all three strobing pulses; an output appears at terminal 37, but not terminal 39, if a data-representing pulse is either delayed or advanced slightly, i.e. so that it commences between the first and second strobing pulses or ceases between the second and third; and outputs appear at both terminals 37, 39 if the data-representing pulse is more delayed or advanced, i.e. commences after or ceases before the second strobing pulse.

No consideration has here been given to the operation of the device described should a data-representing pulse be so delayed as to coincide with none of the three strobing pulses during its correct period. It may briefly be noted that, if such large errors must be detected by the device, the arrangement described may suffice with certain pulse-to-gap ratios for the data-representing pulses, as a large error in one time period may inevitably cause the device to give warning signals in the next time interval; if this is not so with any particular apparatus, usually if the gap between successive data-representing pulses is materially larger than such pulses, then the device will be modified e.g. to use a greater number of strobing pulses at each data-representing pulse time with corresponding modification of the logical network.

Figure 4:
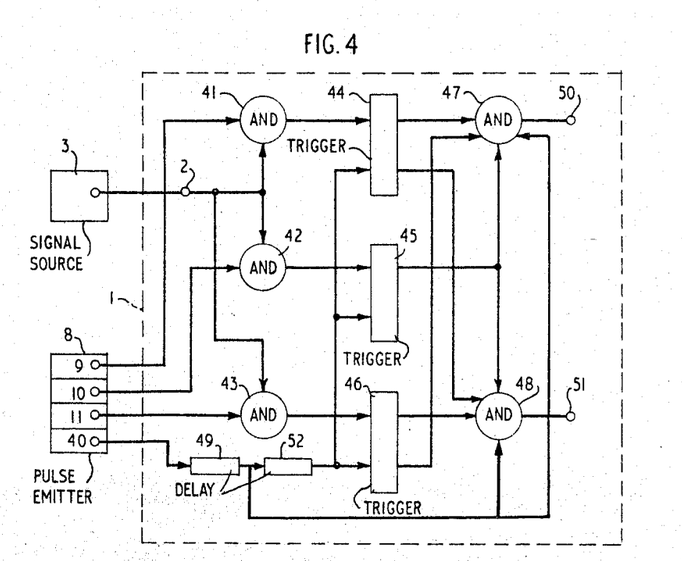
FIGURE 4 shows a further block diagram of a device embodying the invention.

FIGURE 4 shows an embodiment of the invention wherein separate outputs are supplied should the data-representing pulse fail to coincide with either the first strobing pulse or the last strobing pulse. As in FIGURES 1 and 2, there is shown a signal detecting device 1, having an input terminal 2 connected to a source 3 of data-representing pulse signals. Strobing pulses are supplied by a pulse emitter 8 via output terminals 9, 10, 11. Pulse emitter 8 (which is shown here as having four separate sections) has a further output terminal 40 from which a further pulse is supplied after the three strobing pulses.

Terminals 9, 10, and 11 are each connected to inputs of two-input AND gates, 41, 42 and 43 respectively. The other inputs of each of the AND gates 41, 42, 43 are connected to input terminal 2. Further, the outputs of AND gates 41, 42, 43 are connected to the "set" input of trigger circuits 44, 45 and 46 respectively. The outputs of trigger circuits 44, 45, 46 are connected to the inputs of two, four-input AND gates 47 and 48 in the following manner. The "set" outputs of trigger circuits 44 and 45, and the "reset" output of trigger circuit 46 are connected to three inputs of AND gate 47, while the "reset" output of trigger circuit 44 and the "set" outputs of trigger circuits 45 and 46 are connected to inputs of AND gate 48. The fourth input of each of AND gates 47 and 48 is connected to output terminal 40 of pulse emitter 8 via a delay circuit 49 and the outputs of AND gates 47 and 48 are connected to output terminals 50 and 51, respectively, of the detecting device 1. Finally, the "reset" inputs of all three trigger circuits 44, 45, 46 are connected to the output of delay circuit 49 via a further delay circuit 52.

Operation of the device of FIGURE 4 is again dependent upon timing and it is advantageous to again consider firstly what happens when a correctly-timed data-representing pulse is received from source 3. In this case of course both inputs to all three AND gates 41, 42 and 43 will be energised thus allowing outputs to be produced which set all three trigger circuits 44, 45 and 46 into the "set" condition. In this condition however only two inputs of each AND gate 47 and 48 are energised, the two inputs for AND gate 47 being derived from the "set" outputs of trigger circuits 44 and 45, and the two inputs for AND gate 48 being derived from "set" outputs of trigger circuits 45 and 46. Thus when a further input of both AND gates 47, 48 is energised by a pulse from output terminal 40, slightly delayed by delay circuit 49, only three of four inputs are energised and therefore no output is delivered to either of output terminals 50 or 51 from AND gates 47, 48 respectively. Finally all three trigger circuits 44, 45, 46 are reset into the "reset" condition by the delayed pulse at the output of delay circuit 49, further delayed by the other delay circuit 52. The purpose of this further delay by delay circuit 52 is to prevent trigger circuits 44, 45, 46 from being reset before the fourth inputs of AND gates 47, 48 have been energised by the delayed pulse from output terminal 40.

In the case where the data-representing pulse fails to coincide with the first strobing pulse derived from output terminal 9, AND gate 41 will give no output to the trigger circuit 44, which will therefore remain in the "reset" condition, whereas, as before trigger circuits 45, 46 will be set into the "set" condition. In this condition, as can be seen from FIGURE 4, three inputs of AND gate 48 are energised from the "set" outputs of trigger circuits 45, 46 and the "reset" output of trigger circuit 44, whereas only one input of AND gate 47 is energised from the "set" output of trigger circuit 45. Thus when the delayed pulse from output terminal 40 energises the fourth inputs of AND gates 47, 48, AND gate 48 will have all four inputs energised and will therefore deliver an output to output terminal 51, but no output will be delivered to output terminal 50 since only two inputs of AND gate 47 are energised.

Thus a slightly late data-representing pulse will produce an output on terminal 51 only, while in a similar manner a slightly early data-representing pulse will produce an output on terminal 50 only. In this latter case, trigger circuit 46 will remain in the "reset" condition since AND gate 43 is not sufficiently energised to give an output. Thus three inputs of AND gate 47 are energised and when the fourth input is energised by the delayed pulse from terminal 40, an output will be delivered from AND gate 47 to output terminal 50. At the same instant only two inputs of AND gate 48 are energised and no output is delivered therefrom to output terminal 51.

The signal detecting device as shown in FIGURE 4 will give no output should the data-representing pulse be so delayed or advanced as to coincide only with the third or first reference pulse respectively. In these two cases, AND gate 42 will not be sufficiently energised to give an output which will set trigger circuit 45 to the "set" condition. Thus the one input of each of AND gates 47, 48 will not be energised from the set output of trigger circuit 45. Because of this, neither of AND gates 47, 48 will be sufficiently energised to deliver an output to either of output terminals 50, 51.

While it is desirable to receive an indication of such a large error, for the sake of simplicity means for such indication have been omitted from FIGURE 4. Such means could conveniently comprise a three-input AND circuit having one input connected to the "reset" output of trigger circuit 45, a second input connected via an OR circuit to the "set" outputs of trigger circuits 44 and 46, and the third input connected to output terminal 40 via circuit 49. This AND circuit will, of course, give an output upon reception of the delayed pulse from terminal 40 only if the data-representing pulse coincides with either the first or the last strobing pulse but not the second strobing pulse. Such an output can be used as previously to give a warning signal and/or stop the data-reading machine.

The device described in FIGURE 4, wherein different outputs are produced if the data-representing pulse fails to coincide with either the first or the last strobing pulse is particularly applicable for use in connection with the device shown in FIGURE 5 whose operation will now be described. The device shown in FIGURE 5 is essentially used to provide the strobing pulses used in the device of FIGURE 4 and is capable also of making a correction for small errors in timing of the data-representing signal relative to the strobing pulses.

It will of course be appreciated that information indicated by data-representing pulses will only be delivered from the data-reading machine if the second strobing pulse coincides with the data-representing pulse. Thus if the data-representing pulse is incorrectly timed then adjustment of the timing of the strobing pulses in a direction to correct for this error will result in a greater chance of the information being delivered from the data-reading machine.

Figure 5:
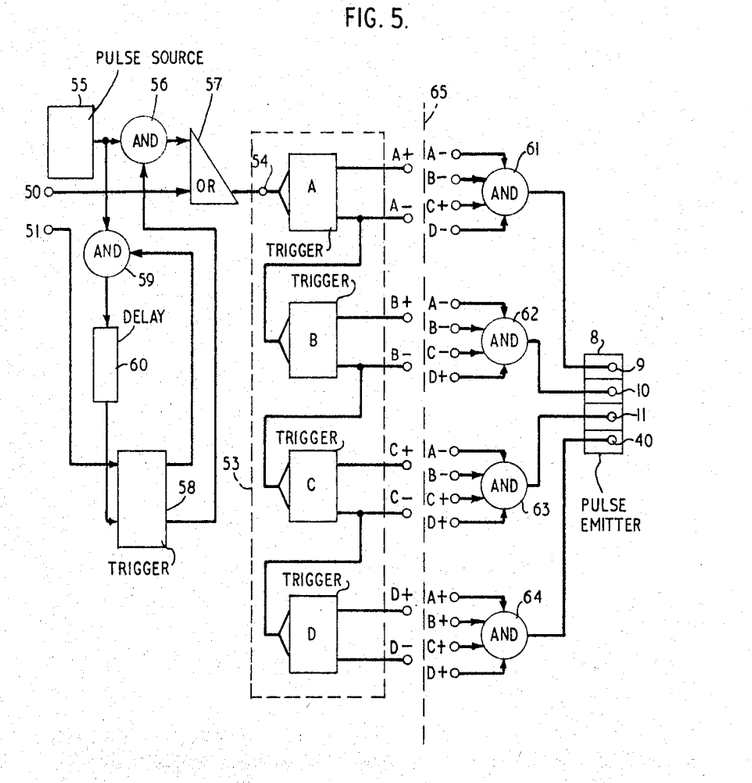
FIGURE 5 shows a block diagram of a device for supplying strobing pulse to the device of FIGURE 4.

FIGURE 5 includes a sixteen-denomination counter 53 (as shown by the dotted outline), consisting of four binary counters, A, B, C and D interconnected in known manner, having one input terminal 54 and sixteen outputs A+ and A— to D+ and D—. The counter can be progressively stepped by pulses from a source 55 of a constant supply reference pulses. Source 55 is connected to one input of a two input AND gate 56 whose output is connected to input terminal 54 of counter 53 via an OR circuit 57. The other input of AND gate 56 is connected to the "reset" output of a trigger circuit 58. The "set" output of trigger circuit 58 is connected to one input of a two input AND gate 59, the output of which is connected via a delay circuit 60 to the reset input of the trigger circuit 58. The two output terminals 50, 51 of the device shown in FIGURE 4 are connected respectively to one input of OR circuit 57 and the "set" input of trigger circuit 58. The outputs A+ and A— to D+ and D— are connected in the following manner to four, four-input AND gates 61, 62, 63 and 64, the interconnections being indicated very diagrammatically by dashed line 65. The four inputs of AND gate 61 are connected to outputs A—, B—, C+ and D— since, when the counter 53 energises these four outputs, this indicates that the counter starting from the zero state has received four pulses on input terminal 54. Similarly eight pulses on input terminal 54 energise outputs A—, B—, C— and D+, these four outputs being connected to the inputs of AND gate 62; twelve pulses on input terminal 54 energises outputs A—, B—, C+ and D+, these four outputs being connected to the inputs of AND gate 63; and fifteen pulses on input terminals 54 energise outputs A+, B+, C+ and D+, these four outputs being connected to the inputs of AND gate 64. The outputs of AND gates 61, 62, 63 and 64 are connected to separate inputs of the pulse generator 8 shown in FIGURE 4 such that, when these AND gates are energised, strobing pulses appear on the separate output terminals 9, 10, 11 and 40 respectively of pulse generator 8.

The device shown in FIGURE 5 is essentially for use in conjunction with the signal detecting device of FIGURE 4, the operation of the device of FIGURE 5 being as follows. Normally the trigger circuit 58 is in the reset condition and therefore the continuous sequence of reference pulses from source 55 will progressively step counter 53 through its sixteen different states since AND gate 56 will always be open to allow passage of such pulses. When counter 53 reaches the four, eight and twelve states AND gates 61, 62 and 63 respectively are opened which causes strobing pulses to be emitted from terminals 9, 10 and 11 respectively of counter 8, to operate the signal detecting device of FIGURE 4. When counter 53 reaches the fifteen state, AND gate 64 opens which causes a pulse to be emitted from terminal 40 which is used to supply an input to the gating means of FIGURE 4 and to reset the settable means thereof as previously described.

If, as a result of these strobing pulses failing to coincide with a data-representing pulse from source 3 of FIGURE 4, an output appears on either of terminals 50 or 51, then the sequence of pulses to terminal 54 of counter 53 will be modified. It should be noted here that the time taken for sixteen reference pulses to be emitted from source 55 is equal to the time interval during which a data-representing pulse may occur and that the time between any two reference pulses is equal to one sixteenth of this time interval.

If, for example, an output appears on output terminal 50, due to the data-representing pulse being advanced within its time interval so as to fail to coincide with the third strobing pulse, then a spurious pulse is supplied to input terminal 54 of counter 53 via OR circuit 57. The delay afforded by delay circuit 49 of FIGURE 4 is of such duration as to prevent the effect of such a spurious pulse being nullified by being applied to input terminal 54 at the same time as a reference pulse from source 55. Because of the introduction of this spurious pulse only three, seven and eleven reference pulses respectively have to be supplied to input 54 of counter 53 to produce the three strobing pulses from pulse emitter 8. The times of occurrence of the three strobing pulses have thus been effectively advanced within the next time interval by one sixteenth thereof. Thus, if, as is likely, the data-representing pulse in this next time interval is advanced by the same amount as in the previous time interval then the chance of coincidence of the data-representing pulse and the third strobing pulse has been increased. If this advance of the strobing pulses is insufficient, the error will continue to be rectified in the following time intervals until the error is eradicated.

In, the other case, where the data-representing pulse is delayed within its times interval so as to fail to coincide with the first strobing pulse, so that an output is derived at terminal 51, this output pulse is applied to the "set" input of trigger circuit 58. So long as this condition obtains this has the effect of preventing reference pulses from source 55 reaching terminal 54 of counter 53, since the second input of AND gate 56 is not energised. However, since the second input of AND gate 59 is energised, one reference pulse from source 55 can pass AND gate 59 which having passed through delay circuit 60 resets trigger circuit 58 to its "reset" condition wherein the second input of AND gate 56 is energized, which allows further reference pulses to reach input 54 of counter 53. The purpose of delay circuit 60 is to prevent the trigger circuit 58 being reset while the pulse which caused the resetting is still being emitted from source 55, since if this did happen and gate 56 would open to allow such pulse to reach input 54.

This removal of one reference pulse has the effect that counter 53 does not reach the four state until the time that the fifth reference pulse is emitted from source 55.

Thus the first strobing pulse is delayed within the succeeding time interval by one sixteenth of such time interval, and similarly the second and third strobing pulses will be equally delayed. Thus, again if as is likely the data-representing pulse is delayed by the same amount as in the previous time interval, then the chance of coincidence of this pulse and the third strobing pulse has been increased. Again if this correction is insufficient, the error will continue to be rectified until it has been eradicated.

The use of the two devices shown in FIGURES 4 and 5 in conjunction with one another both to check data-representing pulses and to correct for any errors detected thereby is of particular application to the reading of punched cards fed into computer assemblies. In this case the data-representing pulses are derived from the hole punched in such card which pulses may conveniently be obtained by photo-electric means which is both a fast and accurate method. The cards may be fed through the reading device means of driven rollers, in which case the pulse emitter 55 in FIGURE 5 from which the reference pulses are derived can be arranged to operate in synchronism with these rollers. Means are provided to prevent such pulses being produced by source 55 until the leading edge of the card reaches a convenient point such that data representing pulses derived from correctly punched holes will be coincident with the three strobing pulses derived from the device of FIGURE 5.

If the holes have been punched incorrectly only to a slight degree in the direction of reading, then warning of such errors is given by output signals which can appear at terminal 50 or 51 of the device shown in FIGURE 4. Further if all the holes passing a single reading unit are displaced by the same amount, as often is the case, or progressive slip occurs between the card and the driving rollers, the compensating device shown in FIGURE 5 can be used with advantage.

As is usual with card reading devices, several portions of the card are scanned simultaneously by the use of a number of reading units mounted at right angles to the direction of travel of the card. Where the primary object of the invention is to detect and correct for slip between the driving rollers and the card, only one device as depicted by FIGURES 4 and 5 need be employed. If the requirement is to correct for skew which may be developed by a card then more than one device as depicted in FIGURES 4 and 5 is required, the number of devices being determined by the degree of skew anticipated and other parameters dictated by the layout of data bearing positions on the card.

Thus a device has been provided which is capable of determining whether data has been correctly entered on media such as punched cards or tape, or even magnetic tape, and further whether such errors can be tolerated or not. Also the device can adjust the timing of subsequent strobing pulses to make corrections for common forms of data misplacement on a medium.

Up to now it has been the usual practice to tolerate a given degree of error in the positioning of the data on the cards and further to tolerate a small percentage of the cards being mis-read. Such mis-readings, however infrequent, are troublesome and often waste valuable computer time.

Where the device is applied to a number of data representing pulse trains, e.g. in the simultaneous sensing of the twelve rows of punching positions on the common form of punched card, a corresponding number of devices embodying the invention may be employed, and some economy of equipment is possible as a single pulse emitter may supply all correcting devices with reference pulses.

Also errors due to skew can be detected as the leading or trailing edges of the data bearing medium are sensed by the data detecting means, using special circuits connected to the outputs of the trigger circuits. These special circuits are capable of comparing the time of sensing of the edges of the medium by the several data detecting devices. These special circuits are designed to give an output, which may be used as an alarm condition, when pre-determined limits of skew are exceeded.

I claim:

1. An electric apparatus for detecting any time displacement of individual electric pulses in a train of similar time-spaced pulses from their respective nominal times of occurrence, including input circuit connections for receiving as input pulses the pulses of the said train, generating means for generating during each nominal time period during which an input pulse should exist a pre-determined plurality of time-spaced reference electric pulses, "AND" gating means electrically connected with the input circuit connections and with the generating means so as to receive both the input pulses and the reference pulses for producing gated pulses indicating periods of co-existence of a reference pulse and an input pulse, a multi-stable state device connected with the AND gating means so as to be triggered cyclically from one stable state to the next in sequence by successive gated pulses during each said nominal time period and to produce at output circuit connections thereof a unique output signal state according to the stable state thereof, the number of stable states of the device being at least equal to the number of reference pulses in the aforesaid plurality.

2. An electric apparatus according to claim 1 including an electric decoding circuit arrangement connected to the output circuit connections of the multi-stable state device and to a source of decoding pulses for producing in response to a decoding pulse an output signal state indicative of the state of the multi-stable state device, and hence indicative of a displacement of an input pulse from its nominal time of occurrence.

3. An electric apparatus according to claim 2, wherein the generating means provides three reference pulses in each nominal time period of an input pulse, wherein the AND gating means comprises a single AND gate having a first input circuit connected with the said input circuit connections for receiving the input pulses, and a second input circuit connected with the generating means for receiving the reference pulses, wherein the multi-stable state device comprises a two-stage binary counter each stage of which has first and second complementary output circuits, and wherein the said decoding means includes two AND gates each having two input circuits connected respectively with a first output circuit of one stage and a second output circuit of the other stage, the two AND gates also including further input circuits connected with the decoding pulse source for receiving decoding pulses, and output circuits connected respectively with first and second output terminals of the apparatus, an output pulse at the said first output terminal indicating coincidence of an input pulse with only one reference pulse, and an output pulse at the said second output terminal indicating coincidence of an input pulse with two consecutive reference pulses.

4. An electric apparatus according to claim 1, wherein the generating means has three separate output circuits and produces three reference pulses in each nominal time period of an input pulse, the reference pulses appearing on the respective output circuits of the generating means, wherein the AND gating means includes first, second and third AND gates each having first and second input circuits and an output circuit, all the first input circuits being connected with the said input circuit connections, the respective second input circuits being connected with the three output circuits respectively of the generating means, and the respective output circuits providing gated pulses indicative respectively of coincidence of an input pulse with a first reference pulse, a second reference pulse, and a third reference pulse respectively, wherein the multi-stable state device includes first and second bistable devices each having first and second input circuits connected with the output circuits of the first and second AND gates respectively, and first and second output circuits for producing complementary output signals in response to said gated pulses applied to the first and second input circuits thereof, and conditioning means connected between the output circuits of the first bistable device and further input circuits of the third AND gate for conditioning the third AND gate so as to cause it to supply its next output signal to the input circuit of the first bistable device such as will cause a change of state of that bistable device, the first bistable device producing at its first output circuit a signal indicative of a coincidence of an input pulse with a first reference pulse or with a third reference pulse and the second bistable device producing at its second output circuit a signal indicative of non-coincidence of an input pulse with a second reference pulse.

5. An electric apparatus according to claim 4, including a decoding means which includes first and second output AND gates each having first and second input circuits and an output circuit, the first and second input circuits of the first output AND gate being connected respectively to the first output circuit of the first bistable device and to a source of decoding pulses, and the output circuit being connected to a first output terminal of the apparatus, and the first and second input circuits of the second output AND gate being connected respectively to the second output of the second bistable device and to the first output terminal of the apparatus and the second output circuit being connected to a second output terminal of the apparatus, the occurrence of output pulses at only the first output terminal of the apparatus indicating than an input pulse is co-incident with two consecutive reference pulses, and simultaneous output pulses at the two output terminals of the apparatus being indicative of coincidence of an input pulse with only a first or a third reference pulse.

6. Electric apparatus according to claim 4, wherein the generating means has three separate output circuits and produces three reference pulses in each nominal time period of an input pulse, the reference pulses appearing on the respective output circuits of the generating means, wherein the AND gating means includes first, second and third AND gates each having first and second input circuits and an output circuit, all the first input circuits being connected with the said input circuit connections, the respective second input circuits being connected with the three output circuits respectively of the generating means, and the respective output circuits providing gated pulses indicative respectively of coincidence of an input pulse with a first reference pulse, a second reference pulse, and a third reference pulse respectively, wherein the multi-stable state device includes first, second and third bistable devices each having input and output circuits, the input circuits being connected with the output circuits of the respective AND gates, and the first and third bistable devices producing, in response to decoding pulses, at first and second output circuits thereof complementary signals indicative of a coincidence of an input pulse with a first reference pulse and with a third reference pulse respectively, and the second bistable device producing at an output circuit thereof an output signal indicative of a coincidence of an input pulse with a second reference pulse, and wherein the decoding arrangement includes two AND gates, the first of which has input circuits connected respectively to the first output circuit of the first bistable device to the first output circuit of the second bistable device, to the second output circuit of the third bistable device, and to the source of decoding pulses, and an output circuit for producing signals indicative that an input pulse has occurred slightly early in relation to the nominal time of occurrence, and the second AND gate having input circuits connected respectively to the first output circuit of the third bistable device, to the first output circuit of the second bistable device, to the second output circuit of the first bistable device, and to the source of decoding pulses, and an output circuit for providing output signals indicative that an input pulse has occurred slightly late in relation to its nominal time of occurrence.

7. An electric apparatus according to claim 6, wherein the pulse generating means comprises a pulse generator for producing pulses at a predetermined frequency, a multi-stage binary counter having an input terminal and complementary output circuits for each stage of the counter, AND gating means having input circuit connected to selected output circuits of the counter and separate output circuits for supplying the said reference pulses, a conrol circuit having an input terminal connected to the pulse generator so as to receive its pulses, and an output terminal connected to the input circuit of the counter so as to deliver thereto pulses derived from the pulse generator, this control circuit including between its said input and output terminals gating means having a control circuit connected with the "slightly late" output circuit of the decoding circuit arrangement for momentarily interrupting the flow of pulses from the pulse generator to the counter on the occurrence of a pulse at the said "slightly late" output circuit of the decoding circuit arrangement, and means for connecting the "slightly early" output circuit of the decoding circuit arrangement to an input circuit of the counter so as to slightly advance the generation of the said reference pulses following the occurrence of a "slightly early" pulse at the said "slightly early" output circuit.

References Cited by the Examiner

UNITED STATES PATENTS

| 3,092,814 | 6/1963 | Hoagland | 328—119 |
| 3,110,866 | 11/1963 | Maure et al. | 328—110 |
| 3,200,340 | 8/1965 | Dunne | 328—201 |

ARTHUR GAUSS, *Primary Examiner.*

B. P. DAVIS, *Assistant Examiner.*